United States Patent
Ma et al.

(10) Patent No.: US 8,086,715 B2
(45) Date of Patent: Dec. 27, 2011

(54) APPARATUS FOR PROVIDING DIGITAL CONTENTS AND METHOD THEREOF

(75) Inventors: Jinsuk Ma, Daejeon (KR); Sunja Kim, Daejeon (KR); Hosang Ham, Daejeon (KR); Chaekyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 21 days.

(21) Appl. No.: 12/611,554

(22) Filed: Nov. 3, 2009

(65) Prior Publication Data
US 2010/0138482 A1 Jun. 3, 2010

(30) Foreign Application Priority Data
Dec. 1, 2008 (KR) .................. 10-2008-0120402

(51) Int. Cl.
*G06F 15/173* (2006.01)
(52) U.S. Cl. ........ 709/223; 709/204; 709/205; 709/217; 709/226; 709/229
(58) Field of Classification Search .................. 709/204, 709/205, 217, 223, 226, 229
See application file for complete search history.

(56) References Cited

U.S. PATENT DOCUMENTS

| | | | |
|---|---|---|---|
| 5,898,456 A | 4/1999 | Wahl | |
| 6,542,964 B1 | 4/2003 | Scharber | |
| 7,370,063 B2 * | 5/2008 | Vilcauskas et al. | 369/30.06 |
| 2006/0259434 A1 * | 11/2006 | Vilcauskas et al. | 705/57 |
| 2007/0070977 A1 | 3/2007 | Kimura et al. | |
| 2009/0106798 A1 * | 4/2009 | Nabatani et al. | 725/46 |
| 2010/0030819 A1 * | 2/2010 | Srinivasan et al. | 707/201 |

FOREIGN PATENT DOCUMENTS

| | | |
|---|---|---|
| JP | 11-149448 | 6/1999 |
| JP | 2005-011218 | 1/2005 |
| JP | 2007-058688 | 3/2007 |
| JP | 2007-164806 | 6/2007 |
| JP | 2008-140215 | 6/2008 |
| KR | 10-2004-0032814 | 4/2004 |
| KR | 10-2007-0021751 | 2/2007 |

OTHER PUBLICATIONS

Alex Rousskov, et al., "Cache Digests," National Laboratory for Applied Network Research, 1998.
European Office Action mailed Apr. 13, 2010 for European Application 09173039.0.
Japanese Office Action issued Jul. 8, 2011 in Japanese Patent Application No. 2009-246192. (3 pages).

* cited by examiner

*Primary Examiner* — Liangche A Wang
(74) *Attorney, Agent, or Firm* — Staas & Halsey LLP

(57) ABSTRACT

Provided is a content manager that receives content tables of adjacent apparatuses for providing digital contents to update its own content table; a content search unit that refers to the content tables of the adjacent apparatuses for providing digital contents to determine whether the contents requested by the user are providable contents and when the contents are the providable contents, grasps a storage location of the corresponding contents; and a content transceiver that when the corresponding contents are stored in the adjacent apparatuses for providing digital contents, requests the corresponding contents to the corresponding adjacent apparatuses for providing digital contents and receives the corresponding contents from the adjacent apparatuses for providing digital contents.

8 Claims, 6 Drawing Sheets

FIG. 4

| PROVIDING DEVICE ID | CONTENTS ID | CONTENTS TITLE | CONTENTS STORAGE LOCATION | CONTENTS DISTRIBUTION DATE | CONTENTS SIZE | REPRODUCING SPEED | REPRODUCING TIME | SERVICE TYPE | CONVERSION TYPE | . . . |
|---|---|---|---|---|---|---|---|---|---|---|
| | | | | | | | | | | |
| | | | | | | | | | | |

APPARATUS FOR PROVIDING DIGITAL CONTENTS AND METHOD THEREOF

RELATED APPLICATIONS

The present application claims priority to Korean Patent Application Serial Number 10-2008-0120402, filed on Dec. 1, 2008, the entirety of which is hereby incorporated by reference.

BACKGROUND OF THE INVENTION

1. Field of the Invention

The present invention relates to an apparatus for providing digital contents capable of distributing and sharing the digital contents and a method thereof. More specifically, the present invention relates to an apparatus for providing digital contents capable of distributing and sharing the digital contents to and with previously registered adjacent apparatuses for providing digital contents and a method for providing digital contents.

2. Description of the Related Art

In recent, a mobile telephone, which is a representative personal communication device, has various additional functions in various types. The mobile telephone already includes a high pixel camera phone, a digital multimedia broadcasting (DMB) receiving function, etc. In particular, the mobile telephone already has a file viewer or a text viewer that is included in an existing smart phone, etc. Further, the mobile phone has functions such as a moving picture player, an MP3 player, etc. which is the already widely used in the representative mobile terminal. In recent, a portable multimedia player (PMP) includes a wireless communication device such as an HSDPA modem or a wireless LAN device in addition to a moving picture and music reproducing function, a text viewer function, a navigation function, etc. and an Internet browser that is software, such that it has a wireless connecting function by Internet. In recent, the i-Pod touch available from Apple Co., etc., has various moving picture and music reproducing function, a slide show function, etc. and can access the Internet by its own wireless LAN function to provide a function that can purchase digital contents online.

Meanwhile, the various personal terminals described above have been subjected to various technical evolving processes and rapidly expanded to a public. According to this tendency, apparatuses for providing digital contents to provide or sell multimedia contents, such as various movies, dramas, music videos, e-books, etc., which are sold online, to a PMS offline, have been developed.

The apparatus for providing digital contents described above can be installed inside or outside a room where users are crowded and receives the corresponding digital contents from a central server using a pre-stored wired data network according to a request of a user and transmits them to a user terminal. As a result, the apparatus for providing digital contents is an apparatus that charges a fee. The apparatus for providing digital contents provides contents data to the mobile device of the user without separately paying a fee for the use of the packet. As a result, the user can be conveniently provided with the digital contents at a desired location at lower price than a case where the user is provided with the digital contents through wireless Internet services of existing mobile operators.

FIG. 1 is a reference diagram for schematically explaining a contents providing scheme of an apparatus for providing digital contents according to the related art.

A process of purchasing contents when a user purchases contents in the apparatus for providing contents in the related art will be described below.

Generally, when a user purchases digital contents (hereinafter, referred to as 'contents') in the apparatuses $10a$ to $10n$ for providing contents, if the contents requested by the user (purchaser) are stored inside the apparatus for providing contents, the apparatus for providing extracts the corresponding contents, converts the extracted corresponding contents to meet a kind of user terminals, and transmits them to the user terminals. However, when the contents requested by the user are not stored inside the apparatuses $10a$ to $10n$ for providing contents, the apparatus for providing contents should request the corresponding contents (contents requested by the user) to a separate central server 20, download the corresponding contents from the central server 20, and provide them to the user.

Through the foregoing scheme, providing contents requested by the user causes substantially several problems. For example, when providing the contents requested by the user through the foregoing scheme, there are problems in that the transmission bandwidth of the central server is largely affected, it takes time to transmit contents between the central server and the apparatus for providing contents, the network load is increased, it takes time to receive contents from the central server and convert the corresponding contents to meet the user terminal, etc.

In addition, when the user needs a long time to receive contents through an offline, a case where the user abandons the purchase of contents occurs, which is a main cause of hindering the activation of the apparatus for providing contents.

SUMMARY OF THE INVENTION

The present invention proposes to solve the above problems.

When contents requested by a user are not stored inside an apparatus for providing contents, a content table of the apparatus for providing contents is continuously updated by using content tables of previously registered apparatuses for providing contents that are adjacent in view of a physical distance or a logical distance and when the user requests contents, the apparatus for providing contents searches whether there are contents by using its own updated content table. It is an object of the present invention to solve the problems of contents transmission time between a central server and an apparatus for providing contents, an increase in network load, etc. and receive user desired contents within a rapid time, when the search result determines that contents are stored in the adjacent apparatuses for providing contents.

There is provided an apparatus for providing digital contents according to the present invention, including: a content manager that receives content tables of adjacent apparatuses for providing digital contents to update its own content table; a content search unit that refers to the updated content tables to determine whether the contents requested by the user are providable contents and when the contents are the providable contents, grasps a storage location of the corresponding contents; a content transceiver that when the corresponding contents are stored in the adjacent apparatuses for providing digital contents, requests the corresponding contents to the corresponding adjacent apparatuses for providing digital contents and receives the corresponding contents from the adjacent apparatuses for providing digital contents.

In particular, the content table includes an identifier of the apparatus for providing digital contents in which the corresponding contents are stored.

Further, the content table further includes at least one of a contents identifier, a contents name, a contents storage location, a contents distribution date, a contents conversion type, a service type, a contents reproducing speed, and a contents reproducing time.

Further, the content manager periodically receives the content tables of the adjacent apparatuses for providing digital contents.

Moreover, the apparatus for providing digital contents further includes a content storage unit that stores contents, wherein when new contents are stored in the content storage unit or the existing contents are deleted from the content storage unit, the content manager updates its own accordingly and transmits the updated content table of the apparatus for providing digital contents to the adjacent apparatuses for providing digital contents.

In addition, the content manager provides the corresponding contents received from the adjacent apparatuses for providing digital contents to a user terminal and then deletes the corresponding contents.

Also, the apparatus for providing digital contents further includes a terminal information grasping unit that extracts profile information on the user terminal from the user terminal.

Further, the profile information includes at least one information of an image compression format supported by the terminal, a spare storage space size of the terminal, screen information on the terminal, a kind of a document supported by the terminal, a moving picture compression format supported by the terminal, a main memory size of the terminal, CPU information on the terminal, platform and library version information mounted in the terminal, and a kind of libraries included in the terminal.

Meanwhile, there is provided a method for providing digital contents, including: receiving content tables of adjacent apparatuses for providing digital contents and updating its own content table; referring to the updated content table to determine whether the contents requested by the user are providable contents; when the contents requested by the user are the providable contents, referring to the updated content table to grasp a storage location of the corresponding contents; and when the corresponding contents are stored in the adjacent apparatuses for providing digital contents, requesting the corresponding contents to the corresponding adjacent apparatuses for providing digital contents.

In particular, the content table includes an identifier of the apparatus for providing digital contents in which the corresponding contents are stored.

Further, the content table further includes at least one of a contents identifier, a contents name, a contents storage location, a contents distribution date, a contents conversion type, a service type, a contents reproducing speed, and a contents reproducing time.

In addition, the updating its own content table by receiving the content tables of the adjacent apparatuses for providing digital contents periodically receives the content tables from the adjacent apparatuses for providing digital contents and updates its own content table.

Also, the method for providing digital contents further includes when new contents are stored or existing contents are deleted, updating its own content table and transmitting its own updated content table to the adjacent apparatuses for providing digital contents.

Moreover, the method for providing digital contents further includes receiving the contents requested by the user from the adjacent apparatuses for providing digital contents to provide them to a user terminal; and deleting the contents received from the adjacent apparatuses for providing digital contents.

Also, the method for providing digital contents further includes extracting profile information on the user terminal from the user terminal.

Further, the profile information includes at least one information of an image compression format supported by the terminal, a spare storage space size of the terminal, screen information on the terminal, a kind of a document supported by the terminal, a moving picture compression format supported by the terminal, a main memory size of the terminal, CPU information on the terminal, platform and library version information included in the terminal, and a kind of libraries mounted in the terminal.

The following effects can be obtained by the present invention.

The present invention can provide various contents to the user as well as rapidly provide the user desired contents as compared to the contents transmission scheme in the related art through a central server, by sharing various digital contents with the previously registered adjacent apparatuses for providing contents. Therefore, the present invention can remarkably improve the purchase efficiency of the digital contents in the apparatus for providing contents as well as easily provide various multimedia contents to many users through the activation of the apparatus for providing contents.

Further, the present invention can reduce the load of the contents server as compared to the scheme of requesting the contents to the central server in the related art, making it possible to reduce a building cost of the central server and reduce the occurrence of the network load at a certain level or more. In addition, the present invention can reduce the building cost of the high-speed Internet line and reduce the unnecessary traffic on the network.

BRIEF DESCRIPTION OF THE DRAWINGS

FIG. 4 is a diagram showing one embodiment of a content table used for the present invention;

DETAILED DESCRIPTION OF THE PREFERRED EMBODIMENTS

The present invention will be described below with reference to the accompanying drawings. Herein, the detailed description of a related known function or configuration that may make the purpose of the present invention unnecessarily ambiguous in describing the present invention will be omitted Exemplary embodiments of the present invention are provided so that those skilled in the art may more completely understand the present invention. Accordingly, the shape, the size, etc., of elements in the figures may be exaggerated for explicit comprehension.

Hereinafter, preferred embodiments of the present invention will be described in detail with reference to the accompanying drawings.

Figure 1:
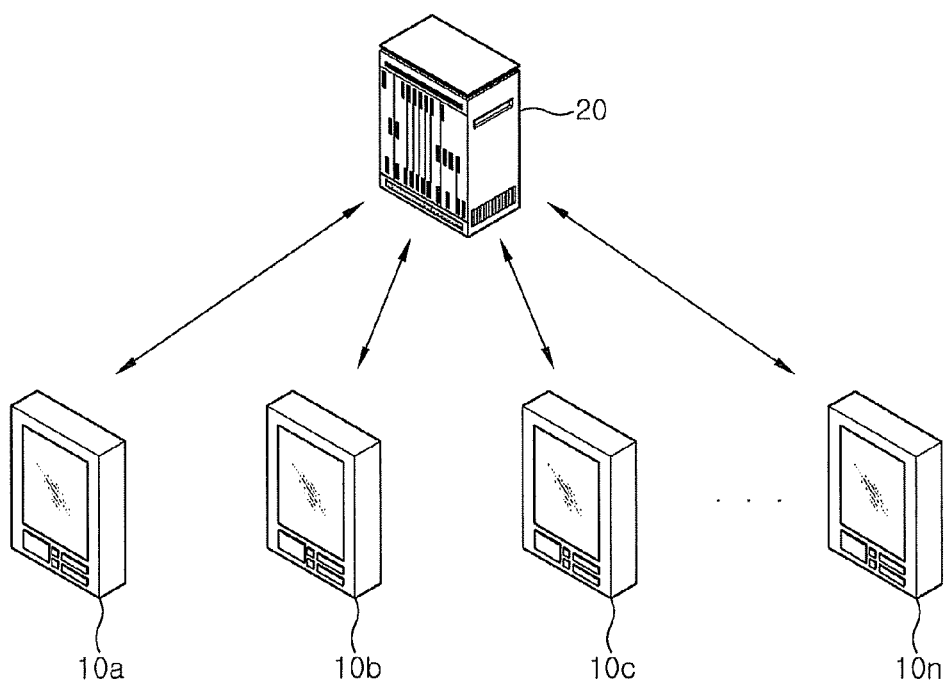
FIG. 1 is a reference diagram for schematically explaining a contents providing scheme of an apparatus for providing digital contents according to the related art.
Figure 2:
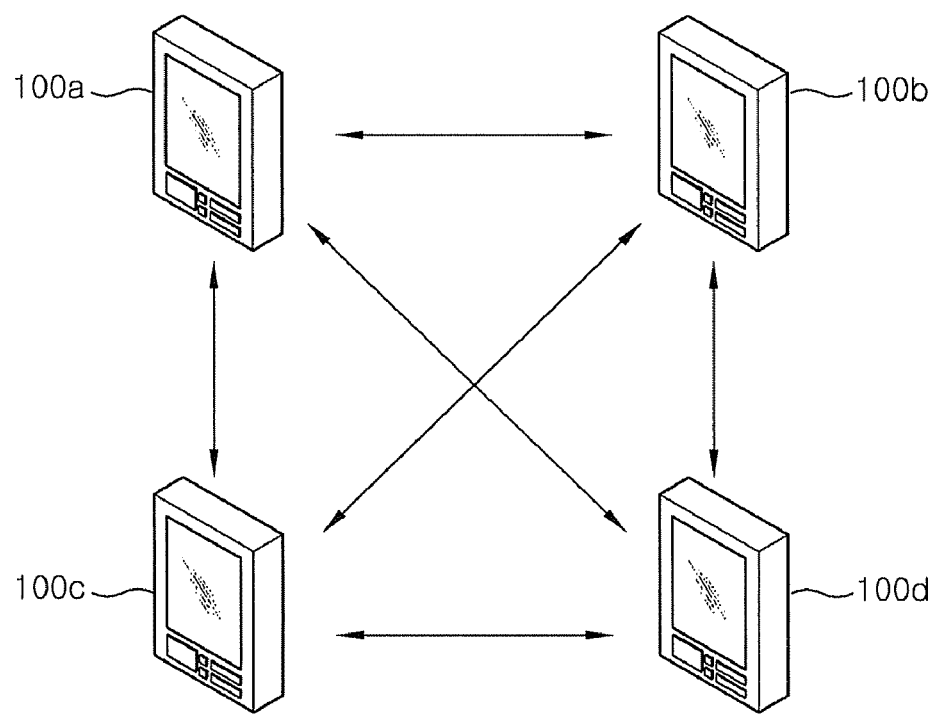
FIG. 2 is a reference diagram for explaining a contents providing scheme of an apparatus for providing digital contents according to the present invention.
Figure 3:
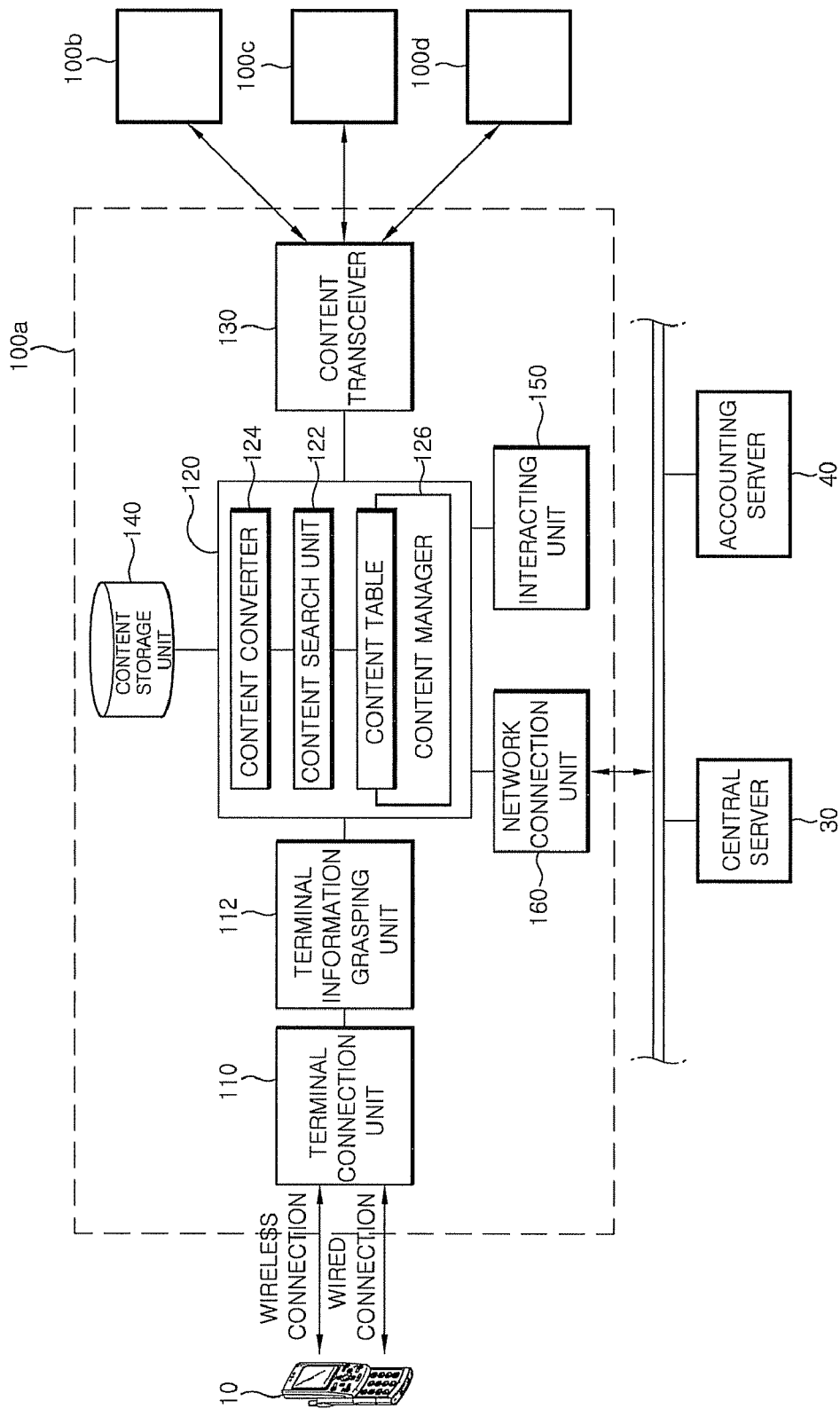
FIG. 3 is a diagram for explaining in detail of a configuration of the apparatus for providing digital contents according to the present invention.

FIG. 2 is a diagram for explaining an operation of an apparatus for providing digital contents according to the present invention and FIG. 3 is a diagram for explaining one embodiment of an apparatus for providing digital contents according to the present invention.

Referring first to FIG. 2, apparatuses 100a to 100d for providing digital contents according to the present invention are interconnected to other apparatuses for providing digital contents that are adjacent thereto to form one group and share the contents. More specifically, the apparatuses 100a to 100d for providing digital contents according to the present invention register identification addresses (for example, IP addresses) of other apparatuses for providing digital contents (hereinafter, referred to as 'adjacent apparatuses for providing contents") that are adjacent to thereto and then perform communication with the adjacent apparatuses for providing contents using a predetermined communication protocol. As shown in FIG. 2, each of the apparatuses 100a to 100d for providing digital contents according to the present invention receives digital contents (hereinafter, referred to as "contents") from other apparatuses for providing digital contents that are adjacent to each other, if necessary, and provides them to user terminals.

As shown in FIG. 2, in the present invention, the plurality of apparatuses for providing digital contents forms one group and the apparatuses for providing digital contents included in the group are connected to each other. Herein, the plurality of apparatuses for providing digital contents that forms one group may be apparatuses for providing digital contents that are adjacent to each other in a physical distance and apparatuses for providing digital contents that are adjacent to each other in a logical distance.

Hereinafter, the apparatus 100a for providing digital contents according to the present invention will be described with reference to FIG. 3. The apparatuses 100a to 100d for providing digital contents shown in FIGS. 2 and 3 have the same configuration and thus, one apparatus 100a for providing digital contents (hereinafter, referred to as 'apparatus for providing contents') will be described below by way of example.

First, a central server 30 is connected to the apparatus 100a for providing contents according to the present invention to store customer management information, such as information on a user terminal that downloads contents, contents purchasing history, interested contents, etc. and manage the entire statistics of used contents. Further, the central server 30 manages the contents history updated in the apparatus 100 for providing contents, a kind and capacity of contents that are currently stored, etc. The central server 30 controls and manages each unit of the apparatus 100 for providing contents.

An accounting server 40 is a unit that charges a fee for contents purchased by the user and charges a fee through the existing used various methods, such as cash, card, E-money, mobile phone payment, etc.

Although the embodiment of the present invention describes the central server 30 and the accounting server 40 that are configured to be separate from the apparatus 100a for providing contents, the functions of the central server 30 and the accounting server 40 may be integrally configured inside the apparatus 100a for providing contents.

The apparatus 100a for providing digital contents according to the present invention includes a terminal connection unit 110, a terminal information grasping unit 112, a controller 120, a content transceiver 130, a content storage unit 140, an interacting unit 150, and a network connection unit 160.

Referring to FIG. 2, the terminal connection unit 110 is connected to a serial communication port, an USB port, a Bluetooth communication module, an infrared communication module, etc., which are included in the user terminal 10, by wired or wireless, such that it can transmit contents requested by the user to the user terminal 10 and communicate the apparatus 100a for providing contents with the user terminal 10.

The terminal information grasping unit 112 requests information on the specification of the user terminal 10 that will reproduce or execute contents to grasp the information on the terminal. At this time, assuming that the specification of the user terminal 10 is previously input in the user terminal 10, a specification information transmitting button built in the user terminal 10 is pressed, thereby making it possible to exchange a message including the information on the apparatus 100a for providing contents according to the present invention and the user terminal. A method for exchanging a message can use known various wireless transmission technologies, such as infrared communication, wireless transmission, etc.

Meanwhile, the user terminal 10 is connected to units such as a cable provided in the apparatus 100a for providing contents according to the present invention and the terminal information grasping unit 112 is connected to the user terminal 10 through the cable to acquire the information on the user terminal 10. The user desired contents may be transmitted from the apparatus 100 for providing contents to the user terminal 10 through the cable for connection.

As another method, the terminal information grasping unit 112 allows the user to directly input the specification of the terminal 10 through a user interface provided by the interacting unit 150.

The terminal information acquired by the foregoing description includes an image compression format supported by the user terminal 10, a spare storage space size of the user terminal 10, screen information on the user terminal 10, a kind of a document supported by the user terminal 10, a moving picture compression format supported by the user terminal 10, a main memory size of the user terminal 10, CPU information on the user terminal 10, platform and library version information mounted in the user terminal 10, and a kind of libraries included in the user terminal 10. One of the examples is information represented in Table 1.

TABLE 1

| PMS Device Specification | Specification Example |
| --- | --- |
| PMS Maker | XX Electron |
| PMS Model Name | PMS-100 |
| Screen Size | 4 inches |
| Screen Resolution | 480 * 640 |
| Color Resolution | 65,536 Color |
| CPU Specification | Intel PXA270 |
| Built-in Memory Size | 128 MB |
| External Memory Size | 1 GB |
| Usable Wireless Transmission Scheme | Bluetooth v1.2, WiFi 802.11a/b/g |
| Maximum Reproducible FPS (frame per second) | 30 |

TABLE 1-continued

| PMS Device Specification | Specification Example |
|---|---|
| Usable Memory Size | 100 MB |
| Platform version | WIPI 2.0 |
| Platform Library Version | SKTlbs1.0; SKTopenGL1.1 |
| Support Multimedia | MPEG4, H.263, MJPEG, MP3, JPEG, PNG, PDF, HTML, TXT |

The content storage unit 140 stores various multimedia contents. The contents stored in the content storage unit 140 may be an original contents file and contents file converted into various forms to meet to the various user terminals. The content storage unit 140 receives the contents file converted in the content converter 120 of the controller 120 to be described later and stores them.

In addition, the content storage unit 140 temporarily stores contents provided from the apparatuses 100b to 100d for providing digital contents, hereinafter, referred to as 'adjacent apparatuses for providing digital contents') that are adjacent to each other and deletes contents provided from the adjacent apparatuses for providing digital contents according to the control of the controller 120.

For example, the content storage unit 140 may store moving pictures, images, MP3 files, documents, etc.

The network connection unit 160 connects the apparatus 100a for providing digital contents according to the present invention to the central server 30 and the accounting server 40 to communicate them each other.

The controller 120 controls each unit to implement the present invention. More specifically, the controller 120 uses the content table to determine whether the contents selected (requested) by the user is stored in the content storage unit 140. As the determination result, when the contents selected by the user is stored in the content storage unit 140, the controller 120 converts the contents selected by the user through a content converter 124 and provides them to the user terminal 10.

The controller 120 includes a content converter 124, a content search unit 122, and a content manager 126. Although FIG. 3 shows a configuration that the content converter 124, the content search unit 122, and the content manager 126 are included in the controller 120, each unit may be implemented to be separate from the controller 120.

The content converter 124 extracts the contents file requested (selected) by the user from the content storage unit 140, converts them to meet a kind of the user terminal, and provides them to the user terminal 10. Further, the content converter 124 converts contents file provided from adjacent apparatuses 100b-100d for providing digital contents to meet a kind of the user terminal (that is, specification requested at the time of selling digital contents).

In more detail, the content converter 124 includes an image converter (not shown), a document converter (not shown), a moving picture converter (not shown), and a compiler/linker (not shown) for converting application programs operated in the user terminal.

The image converter receives information, such as the image compression format supported by the user terminal 10, the spare storage space size of the user terminal, the screen information of the user terminal, etc. and uses it, such that it converts the images stored in the content storage unit 140 into a form optimized for the user terminal.

The document converter receives a kind of documents supported by the user terminal 10, the spare storage space size of the user terminal, the screen information of the user terminal, etc. and uses them, such that it converts the documents stored in the content storage unit 140 into a form optimized for the user terminal.

The moving picture converter receives the moving picture compression format supported by the user terminal 10, a spare storage space size of the user terminal, the screen information on the user terminal, the main memory size of the user terminal, the CPU information etc. and uses them, such that it converts the moving pictures stored in the content storage unit 140 into a form optimized for the user terminal.

The compiler/linker receives the platform and library version information mounted in the user terminal 10, a kind of mounted libraries, a mail memory size of the user terminal, the CPU information, the screen information of the user terminal, etc. and uses them, such that it performs an operation of building the contents stored in the content storage unit 140 again.

The content search unit 122 searches the contents file using the content table. Herein, the content table means a table that allows the content manager 126 to manage the information on the contents stored in the content storage unit 140 and the adjacent apparatuses 100b to 100d for providing digital contents. The content search unit 122 uses identification information (contents ID or contents title of FIG. 4) on the contents included in the content table to determine whether the contents requested by the user can be provided. The content search unit 122 uses an identifier (providing apparatus ID of FIG. 4) of the apparatus for providing digital contents included in the content table when the contents requested by the user is the providable contents to determine the position in which the corresponding contents are stored. The content table used for the present invention will be described in more detail in the description of the content manager 126 to be described below.

The content manager 126 uses the content table to manage the contents that can be provided to the user. In more detail, the content manager 126 periodically requests the content tables of the apparatuses 100b to 100d for providing digital contents to the adjacent apparatuses 100b to 100d for providing digital contents and receives each content table of the adjacent apparatuses 100b to 100d for providing digital contents from the adjacent apparatuses 100b to 100d for providing digital contents to update its own content table. Herein, 'updating' means a case of adding, deleting, and exchanging the information in the content table by the changing information (transaction file) and preparing the content table having new contents.

An example of the content table managed by the content manager 126 and the content tables received from the adjacent apparatuses 100b to 100d for providing digital contents is shown in FIG. 4.

The content table used for the present invention includes an identifier of an apparatus for providing digital contents in which the corresponding contents are stored, an identifier of the corresponding contents, a title of the corresponding contents, a position of the corresponding contents stored inside the apparatus for providing digital contents, a data finally distributing the corresponding contents, a reproducing speed of the corresponding contents, a reproducing time of the corresponding contents, a service type of the corresponding contents (for example, movie, news, documentary, etc.), a conversion type of the corresponding contents, etc.

Meanwhile, the content manager 126 updates its own content table when the changing information is generated in its own content table and transmits the updated content table to the adjacent apparatuses 100b to 100d for providing digital contents through the content transceiver 130. For example, when adding new contents to the content storage unit 140 or deleting the existing contents from the content storage unit 140, the content manager 126 updates its own content table and transmits the updated content table to the adjacent apparatuses 100b to 100d for providing digital contents through the content transceiver 130 This is likewise applied to the adjacent apparatuses 100b to 100d for providing digital contents.

In the present invention, the content tables are exchanged with each other between the apparatuses for providing digital contents included in one group and its own content table is updated based thereon, such that the apparatuses for providing digital contents included in one group shares one content table.

According to the foregoing description, when the user requests the specific contents, even though the corresponding contents is not stored inside thereof, it is possible to rapidly grasp the stored position of the corresponding contents through the stored position of the corresponding contents included in the content table without searching whether the corresponding contents are stored in the adjacent apparatuses for providing digital contents one by one. In addition, it is possible to immediately request the corresponding contents to the corresponding apparatus for providing digital contents, such that the contents can be rapidly provided to the user. Therefore, it is possible to prevent the network load from increasing due to the unnecessary traffic.

Further, the present invention can distribute and share various digital contents and store a large amount of contents, thereby making it possible to overcome the problem of the limited storage capacity of each of the apparatuses for providing digital contents as well as easily provide various multimedia contents to a large number of users by the activation of the apparatus for providing contents.

The content transceiver 130 uses a predetermined communication protocol to perform the communication with the adjacent apparatuses 100b to 100d for providing digital contents. In more detail, the contents transceiver 130 transmits a message, which requests the content table to the adjacent apparatuses 100b to 100d for providing digital contents, and receives the content tables from the adjacent apparatuses 100b to 100d for providing digital contents accordingly. Further, the contents transceiver 130 transmits a message, which requests necessary contents to the adjacent apparatuses 100b to 100d for providing digital contents, and receives the corresponding contents from the adjacent apparatuses 100b to 100d for providing digital contents accordingly.

The interacting unit 140 displays output results to the user through the user interface and receives the user selection accordingly. Preferably, the interacting unit 140 used for the present invention is implemented by a unit that may receive the user selection and display the output results to the user, for example, a touch screen.

Figure 5:
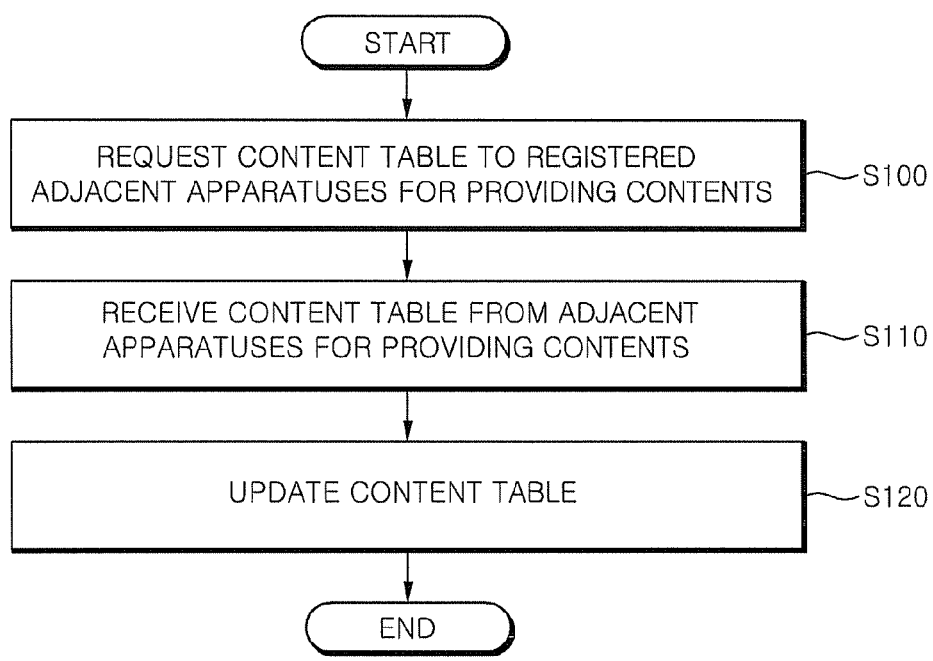
FIG. 5 is a flowchart for explaining a process of allowing an apparatus for providing digital contents to receive the content tables from adjacent apparatuses for providing digital contents to update its own content table.

FIG. 5 is a flowchart for explaining a process of allowing an apparatus for providing digital contents to receive the content table from adjacent apparatuses for providing digital contents to update its own content table.

The apparatus for providing digital contents according to the present invention periodically requests the content tables of the adjacent apparatuses for providing digital contents to the adjacent apparatuses for providing digital contents (S100).

The apparatus for providing digital contents receives the content tables of the adjacent apparatuses for providing digital contents from the adjacent apparatuses for providing digital contents (S110) and uses the received content tables to update its own content table (S120).

Although not shown in the drawings, the apparatus for providing digital contents according to the present invention updates its own content table when the changing information is generated in its own content table and transmits the updated content table to the adjacent apparatuses for providing digital contents. For example, when the new contents are added or the existing contents are deleted, the apparatus for providing digital contents according to the present invention updates its own content table and transmits the updated content table to the adjacent apparatuses for providing digital contents. In other words, the apparatus for providing digital contents updates the content table every time the change history of the inside contents is generated and transmits them to the adjacent apparatuses for providing digital contents, such that the apparatuses for providing digital contents included in one group can share the same content table with the adjacent apparatuses for providing digital contents in real time. Therefore, it is possible to grasp the content history stored in the adjacent apparatuses for providing digital contents in real time.

Figure 6:
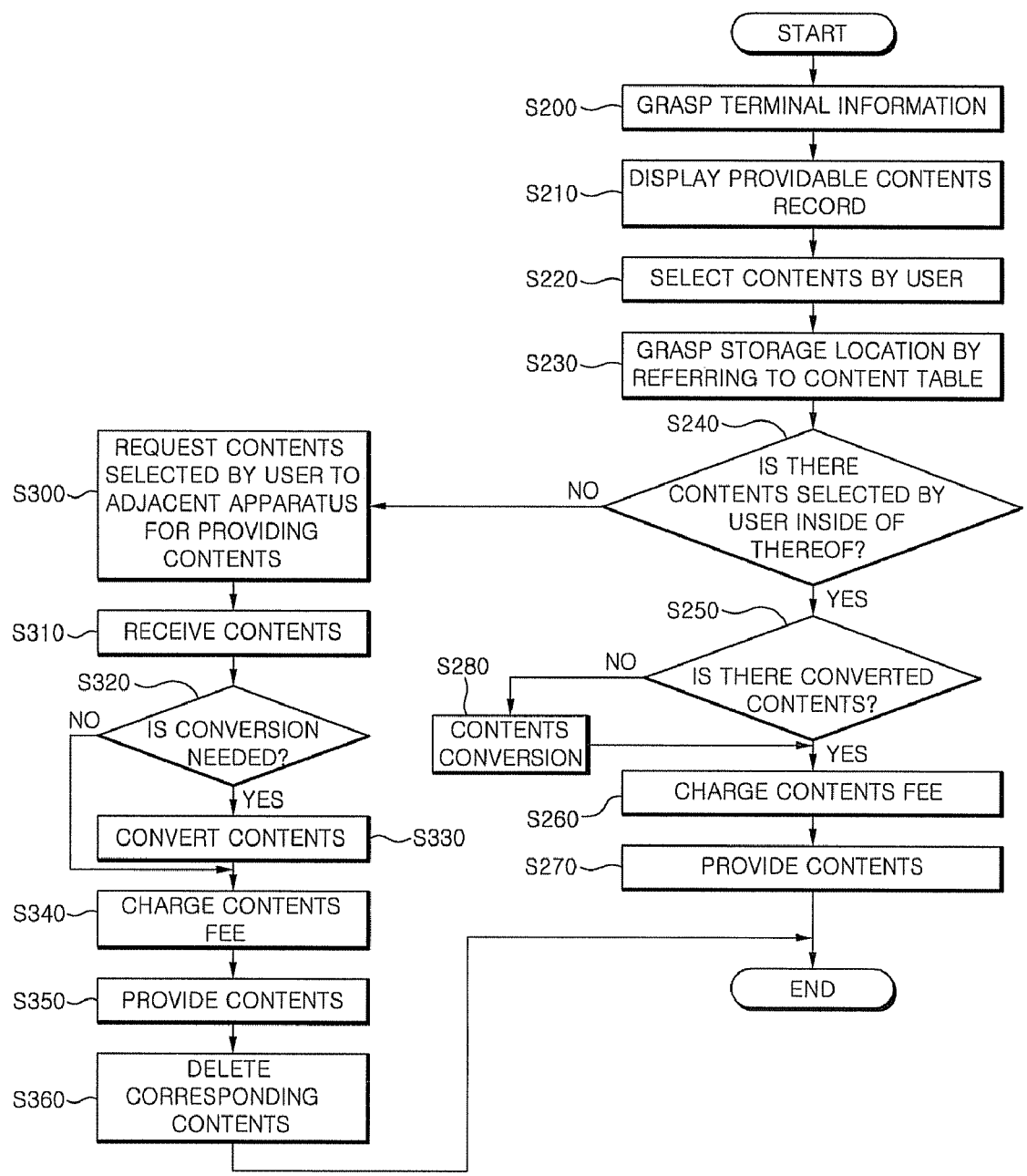
FIG. 6 is a flowchart for explaining a method for providing digital contents to a user by the apparatus for providing digital contents according to the present invention.

FIG. 6 is a flowchart for explaining a method for providing digital contents to a user by the apparatus for providing digital contents according to the present invention.

It requests information on the specification of the user terminal that will reproduce or execute contents to grasp the information on the user terminal (S200). At this time, assuming that the specification of the user terminal is previously input in the user terminal, a specification information transmitting button built in the user terminal is pressed, thereby making it possible to exchange a message including the information on the apparatus for providing contents according to the present invention and the user terminal. A method for exchanging a message can use known various wireless transmission technologies, such as infrared communication, wireless transmission, etc. Meanwhile, the user terminal is connected to units such as a cable provided in the apparatus for providing contents according to the present invention and the terminal information grasping unit is connected to the user terminal through the cable to acquire the information on the user terminal. The user desired contents may be transmitted from the apparatus for providing contents to the user terminal through the cable for connection.

Next, it displays the content history, which is selected by the user, that is, provided to the user, to the user by referring to its own content table (S210). At this time, the content history, which can be provided to the user, includes the contents that can be provided from the adjacent apparatuses for providing digital contents included in a group as described above.

It displays the providable content history to the user at step S210 and receives the user selection accordingly (S220).

Meanwhile, steps S210 and S200 describes that the providable content history is displayed to the user and the user input is input accordingly, but are not limited thereto. In other words, it immediately receives the identification information of the user desired contents from the user and refers to the content table to search whether the contents can be provided and may information the user of the corresponding results.

When the user selection is received at step S220, the stored position of the corresponding contents is grasped by referring to the content table (S230). At this time, the contents selected by the user may be stored the inside thereof and stored in the adjacent apparatuses for providing digital contents included in the group. Therefore, at step S230, the stored position of the corresponding contents is grasped by referring to the identifier of the apparatus for providing digital contents included in the content table.

It determines whether the contents selected by the user exist in the inside thereof (S240). When the contents selected by the user, that is, the corresponding contents are stored in the inside thereof, it determines whether the corresponding contents are contents converted to meet the user terminal (S250).

As the determination result at step S250, when the contents selected by the user are stored in the inside thereof and are contents converted to meet the user terminal, it charges a fee to the user according to the provision of the contents and then provides the converted contents to the user terminal (S260 and S270).

On the other hand, as the determination result at step S250, although the contents selected by the user are stored the inside thereof, when it is necessary to convert them to meet the user terminal, it converts the contents to meet the user terminal (S280). It charges a fee to the user according to the provision of the contents and provides the converted contents to the user terminal (S260 and S270).

Meanwhile, at step S240, when the contents selected by the user, that is, the corresponding contents are stored in the outside thereof (that is, adjacent apparatuses for providing digital contents), it requests the contents selected by the user to the corresponding adjacent apparatuses for providing digital contents by referring to the content table (S300).

Next, it receives the contents requested by the user from the corresponding adjacent apparatuses for providing digital contents according to the request at step S300 (S310).

It determines whether it is necessary to convert the corresponding contents received from the adjacent apparatuses for providing digital contents (S320). As the determination result at step S320, when it is necessary to convert the contents to meet the user terminal, it converts the corresponding contents to meet the user terminal (S330).

It charges a fee to the user according to the provision of the contents and provides the converted contents to the user terminal (S340 and S360).

It provides the corresponding contents to the user terminal at step S360 and deletes the corresponding contents stored in the inside thereof (S360). It deletes the contents provided from the adjacent apparatuses for providing digital contents at step S360, thereby preventing the contents from being doubly stored in the several apparatuses for providing digital contents. Further, it can prevent the contents from being concentrated in any one of the apparatuses for providing digital contents in the group.

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for providing digital contents that is included in a group consisting of a plurality of apparatuses for providing digital contents and interconnected with adjacent apparatuses for providing digital contents, comprising:
   a content manager that receives content tables of adjacent apparatuses for providing digital contents to update a content table of the apparatus for providing digital contents;
   a content search unit that refers to the updated content table to determine whether the contents requested by the user are providable contents and when the contents are the providable contents, grasps a storage location of the corresponding contents;
   a content transceiver that when the corresponding contents are stored in the adjacent apparatuses for providing digital contents, requests the corresponding contents to the corresponding adjacent apparatuses for providing digital contents and receives the corresponding contents from the adjacent apparatuses for providing digital contents; and
   a terminal information grasping unit that extracts profile information on a user terminal from the user terminal,
   wherein the content table includes an identifier of the apparatus for providing digital contents in which the corresponding contents are stored,
   wherein the content manager periodically receives the content tables of the adjacent apparatuses for providing digital contents, and
   wherein the profile information includes at least one information of an image compression format supported by the terminal, a spare storage space size of the terminal, screen information on the terminal, a kind of a document supported by the terminal, a moving picture compression format supported by the terminal, a main memory size of the terminal, CPU information on the terminal, platform and library version information mounted in the terminal, and a kind of libraries included in the terminal.

2. The apparatus for providing digital contents according to claim 1, wherein the content table further includes at least one of a contents identifier, a contents name, a contents storage location, a contents distribution date, a contents conversion type, a service type, a contents reproducing speed, and a contents reproducing time.

3. The apparatus for providing digital contents according to claim 1, further comprising a content storage unit that stores contents,
   wherein when new contents are stored in the content storage unit or the existing contents are deleted from the content storage unit, the content manager updates its own content table accordingly and transmits the updated content table of the apparatus for providing digital contents to the adjacent apparatuses for providing digital contents.

4. The apparatus for providing digital contents according to claim 1, wherein the content manager provides the corresponding contents received from the adjacent apparatuses for providing digital contents to a user terminal and then deletes the corresponding contents.

5. A method for providing digital contents by an apparatus for providing digital contents that is included in a group consisting of a plurality of apparatuses for providing digital contents and interconnected with adjacent apparatuses for providing digital contents, comprising:

receiving content tables of adjacent apparatuses for providing digital contents and updating its own content table;

referring to the updated content table of the apparatus for providing digital contents to determine whether the contents requested by the user are providable contents;

when the contents requested by the user are the providable contents, referring to the updated content table to grasp a storage location of the corresponding contents; and when the corresponding contents are stored in the adjacent apparatuses for providing digital contents, requesting the corresponding contents to the corresponding adjacent apparatuses for providing digital contents; and extracting profile information on a user terminal from the user terminal, wherein the content table includes an identifier of the apparatus for providing digital contents in which the corresponding contents are stored, wherein the updating its own content table by receiving the content tables of the adjacent apparatuses for providing digital contents periodically receives the content tables from the adjacent apparatuses for providing digital contents and update a content table of the apparatus for providing digital contents, and wherein the profile information includes at least one information of an image compression format supported by the terminal, a spare storage space size of the terminal, screen information on the terminal, a kind of a document supported by the terminal, a moving picture compression format supported by the terminal, a main memory size of the terminal, CPU information on the terminal, platform and library version information included in the terminal, and a kind of libraries mounted in the terminal.

6. The method for providing digital contents according to claim 5, wherein the content table further includes at least one of a contents identifier, a contents name, a contents storage location, a contents distribution date, a contents conversion type, a service type, a contents reproducing speed, and a contents reproducing time.

7. The method for providing digital contents according to claim 5, further comprising when new contents are stored or existing contents are deleted, updating its own content table and transmitting its own updated content table to the adjacent apparatuses for providing digital contents.

8. The method for providing digital contents according to claim 5, further comprising:

receiving the contents requested by the user from the adjacent apparatuses for providing digital contents to provide them to a user terminal; and deleting the contents received from the adjacent apparatuses for providing digital contents.

* * * * *